(12) United States Patent
Felger

(10) Patent No.: US 6,282,276 B1
(45) Date of Patent: *Aug. 28, 2001

(54) METHOD OF BILLING A VALUE-ADDED CALL

(76) Inventor: David Felger, c/o The National Psychic Association, Inc. Camino Real Centre-7200 Camino Real, Suite 300, Boca Raton, FL (US) 33433

( * ) Notice: Subject to any disclaimer, the term of this patent is extended or adjusted under 35 U.S.C. 154(b) by 0 days.

This patent is subject to a terminal disclaimer.

(21) Appl. No.: 09/495,923

(22) Filed: Feb. 2, 2000

Related U.S. Application Data

(63) Continuation-in-part of application No. 09/432,808, filed on Nov. 4, 1999, now abandoned, which is a continuation-in-part of application No. 09/356,572, filed on Jul. 19, 1999, now abandoned, which is a continuation-in-part of application No. 09/039,335, filed on Mar. 16, 1998, now abandoned, which is a continuation-in-part of application No. 08/757,563, filed on Nov. 27, 1996, now Pat. No. 5,960,069, which is a continuation-in-part of application No. 08/658,378, filed on Jun. 5, 1996, now Pat. No. 5,802,156.

(51) Int. Cl.[7] .................................................. H04M 17/00
(52) U.S. Cl. .......................... 379/144; 379/127; 379/145; 379/114
(58) Field of Search ........................... 379/111–119, 121, 379/127, 133–134, 188–189, 201–202, 144, 123, 125, 265, 266, 91.01, 194

(56) References Cited

U.S. PATENT DOCUMENTS

| | | | |
|---|---|---|---|
| 3,912,874 | 10/1975 | Botterell et al. | 179/18 |
| 3,920,908 | 11/1975 | Kraus | 179/2 |
| 4,567,359 | 1/1986 | Lockwood | 235/381 |
| 4,750,201 | 6/1988 | Hodgson et al. | 379/144 |
| 4,757,267 | 7/1988 | Riskin | 379/113 |
| 4,792,968 | 12/1988 | Katz | 379/92 |
| 4,823,264 | 4/1989 | Deming | 364/408 |
| 4,908,850 | 3/1990 | Masson et al. | 379/88 |
| 4,939,773 | 7/1990 | Katz | 379/204 |
| 4,943,996 | 7/1990 | Baker, Jr. et al. | 379/96 |
| 4,949,373 | 8/1990 | Baker, Jr. et al. | 379/96 |

(List continued on next page.)

Primary Examiner—Duc Nguyen
(74) Attorney, Agent, or Firm—Banner & Witcoff, Ltd

(57) ABSTRACT

A method of billing a telephone call between a caller and a value-added service. A request is received from a caller for a telephone call between the caller and the value-added service. Information associated with a credit account is requested before the caller is connected to the value-added service. The information associated with the credit account, such as credit card information, debit card information or checking account information, is received in real time. Credit account information, which includes the received information associated with the credit account and a predetermined amount that is to be charged to the credit account, is communicated to a payment authorization database, which can be located locally or remotely. Alternatively, the credit account information includes the received information associated with the credit account and a predetermined amount that is to be set aside in the credit account for the telephone call. Payment authorization information associated with the credit account is received from the remote site before the caller is connected to the value-added service. The caller is connected to the value-added service when the payment authorization information is affirmative. A total charge for the telephone call that is based on an actual time that the caller is connected to the value-added service is calculated when the telephone call is terminated. Lastly, call charge information associated with the telephone call is transmitted to the remote site when the telephone call is terminated, the call charge information including information for charging the credit account an amount representing a charge for the telephone call.

118 Claims, 6 Drawing Sheets

U.S. PATENT DOCUMENTS

| | | | |
|---|---|---|---|
| 4,987,587 | 1/1991 | Jolissant | 379/94 |
| 4,989,234 | 1/1991 | Schakowski et al. | 379/92 |
| 5,003,584 | 3/1991 | Benyacar et al. | 379/119 |
| 5,003,595 | 3/1991 | Collins et al. | 380/25 |
| 5,007,084 | 4/1991 | Materna et al. | 380/24 |
| 5,023,904 | 6/1991 | Kaplan et al. | 379/91 |
| 5,181,238 | 1/1993 | Medamana et al. | 379/95 |
| 5,187,710 | 2/1993 | Chau et al. | 370/110.1 |
| 5,210,794 | 5/1993 | Brunsgard | 380/9 |
| 5,214,688 | 5/1993 | Szlam et al. | 379/67 |
| 5,223,699 | 6/1993 | Flynn et al. | 235/380 |
| 5,237,159 | 8/1993 | Stephens et al. | 235/379 |
| 5,283,829 | 2/1994 | Anderson | 380/24 |
| 5,287,403 | 2/1994 | Atkins et al. | 379/144 |
| 5,297,197 | 3/1994 | Katz | 379/204 |
| 5,309,504 | 5/1994 | Morganstein | 379/67 |
| 5,333,181 | 7/1994 | Biggs | 379/91 |
| 5,335,266 | 8/1994 | Richardson, Jr. et al. | 379/88 |
| 5,351,994 | 10/1994 | Pollin | 283/117 |
| 5,383,113 | 1/1995 | Kight et al. | 364/401 |
| 5,438,615 | 8/1995 | Moen | 379/144 |
| 5,442,688 | 8/1995 | Katz | 379/156 |
| 5,452,348 | 9/1995 | Adams et al. | 379/202 |
| 5,465,206 | 11/1995 | Hilt et al. | 364/406 |
| 5,465,290 | 11/1995 | Hampton et al. | 379/67 |
| 5,467,269 | 11/1995 | Flaten | 364/401 |
| 5,475,740 | 12/1995 | Boggs, Jr. et al. | 379/91 |
| 5,475,747 | 12/1995 | Bales et al. | 379/201 |
| 5,479,510 | 12/1995 | Olsen et al. | 380/24 |
| 5,485,370 | 1/1996 | Moss. et al. | 364/408 |
| 5,502,762 | 3/1996 | Andrew et al. | 379/202 |
| 5,509,055 | 4/1996 | Ehrlich et al. | 379/133 |
| 5,524,142 | 6/1996 | Lewis et al. | 379/112 |
| 5,537,470 | 7/1996 | Lee | 379/266 |
| 5,561,707 | 10/1996 | Katz | 379/88 |
| 5,566,234 | 10/1996 | Reed et al. | 379/188 |
| 5,633,919 | 5/1997 | Hogan et al. | 379/115 |
| 5,652,786 | 7/1997 | Rogers | 379/91.01 |
| 5,704,046 | 12/1997 | Hogan | 395/239 |
| 5,715,314 | 2/1998 | Payne et al. | 380/24 |
| 5,719,928 | 2/1998 | Pinnell et al. | 379/202 |
| 5,724,424 | 3/1998 | Gifford | 380/24 |
| 5,742,674 | 4/1998 | Jain et al. | 379/209 |
| 5,802,156 * | 9/1998 | Felger | 379/112 |
| 5,828,734 | 10/1998 | Katz | 379/93.13 |
| 5,828,845 * | 10/1998 | Jagadish et al. | 395/200.59 |
| 5,841,469 | 11/1998 | Freeman et al. | 348/15 |
| 5,867,562 | 2/1999 | Scherer | 379/88 |
| 5,875,236 | 2/1999 | Jankowitz et al. | 379/114 |
| 5,933,480 | 8/1999 | Felger | 379/112 |
| 5,960,069 * | 9/1999 | Felger | 379/114 |
| 5,963,625 * | 10/1999 | Kawecki et al. | 379/114 |

* cited by examiner

METHOD OF BILLING A VALUE-ADDED CALL

The present application is a continuation-in-part application of U.S. patent application Ser. No. 09/432,808, filed Nov. 4, 1999 abandoned; which is a continuation-part application of U.S. patent application Ser. No. 09/356,572, filed Jul. 19, 1999 abandoned; which is a continuation-in-part application of U.S. patent application Ser. No. 09/039,335, filed Mar. 16, 1998, now abandoned; which is a continuation-in-part of U.S. patent Ser. No. 08/757,563, filed Nov. 27, 1996, now U.S. Pat. No. 5,960,069; which is a continuation-in-part of U.S. patent application Ser. No. 08/658,378, filed Jun. 5, 1996, now U.S. Pat. No. 5,802,156, each of which are incorporated by reference herein. The present application is also related to U.S. patent application Ser. No. 09/495,924 filed Feb. 2, 2000; which is a continuation-in-part application of U.S. patent application Ser. No. 08/432,809, filed Nov. 4, 1999; which is a continuation-in-part application of U.S. patent application Ser. No. 09/362,239, filed Jul. 28, 1999, and now abandoned; which is a continuation-in-part application of U.S. patent application Ser. No. 09/280,862, filed Mar. 30, 1999, and now abandoned; which is a continuation-in-part application of U.S. patent application Ser. No. 09/245,713, filed Feb. 8, 1999, and now abandoned; and is is related to U.S. patent application Ser. No. 09/432,811, filed Nov. 4, 1999; which is a continuation-in-part application of U.S. patent application Ser. No. 09/362,238, filed Jul. 28, 1999, and now abandoned; which is a continuation-in-part application of U.S. patent application Ser. No. 09/280,863, filed Mar. 30, 1999, and now abandoned; which is a continuation-in-part application of U.S. patent application Ser. No. 09/245,713, filed Feb. 8, 1999, and now abandoned, each of which is incorporated by reference herein. Additionally, the present application claims benefit of U.S. Provisional Patent Application Serial No. 60/139,475, filed Jun. 17, 1999, which is incorporated by reference herein.

I. BACKGROUND OF THE INVENTION

A. Technical Field

The present invention relates to a method for billing a service representative call, for example, for a psychic counseling network service, such as the Yellow Pages Psychic Network (™) service available from Zodiac Group, Inc. and to call limiting, call blocking, fraud control and payment and billing arrangements thereof.

B. Description of the Related Arts

So-called psychic network services have been in operation for several years. A service representative, or agent, at such a service counsels a caller who has called on an 800 or 900 telephone number regarding life, love and prosperity. For a fee, the caller can ask any question of the service representative and, generally, the service representative may counsel to the caller regarding the question.

Presently, a caller to the Yellow Pages Psychic Network service dials one of a plurality of telephone numbers that are used by the network for determining the advertising source from which the caller became aware of the psychic network service. Each respective telephone number connects a caller to the same service bureau where an automatic call distribution (ACD) system distributes calls among service representatives. The caller hears an announcement regarding costs and charges, referred to as a preamble, and is then offered a menu of choices. The caller is given a choice to hear brief resumes of the service representatives that are presently available. When the caller decides on a specific psychic, the caller may press the * button, for example, to reach that particular psychic. When the caller already knows the extension number of a psychic that the caller has used before, that particular telephone extension may be entered. The caller controls the call, but can speak only to one psychic during the call.

ACD telecommunications equipment is known for providing this and other types of telecommunications services. Common-controlled ACD equipment is available, for example, from Lucent Technologies, Inc. and other manufacturers of common-controlled switching equipment. Typically, a service bureau or related organization offers services through a service bureau-owned ACD system. Such an ACD system directs a call from a caller requesting service to a next available service representative listed in a service representative availability queue. It is always assumed that one service representative responds to a call. Service representatives, typically equipped with displays and operator type headsets for hands-free operation, usually consult databases for, for example, making travel reservations. To this end, service representatives have access to large computer databases of travel reservation and billing information.

Billing arrangements for such service bureau organizations are primitive and may rely on a 900 service for the service provider to bill the caller for the service provided. For an 800 number call, the service provider pays for the call and must insure that payment for the service will be received, even more so than for 900-based call. The service provider records credit card or other payment data manually into a memory of a billing system for properly billing the call. Such procedures have led to many callers questioning their bills in many instances. Additionally, dishonest callers have received free calls using fraudulent payment schemes, improper granting of credit and the like because of inefficiencies associated with conventional billing procedures.

One approach for overcoming these and other problems is provided by a service offered by a company known as Mile High Psychics that uses credit cards for prepayment for blocks of service usage time. Credit authorization is obtained well in advance of when service is provided. For example, the customer may purchase a block of 25 minutes of service in advance of a call and utilize a personal identification number or code (PIN) at the time of the call for accessing the service.

Another approach is presented by U.S. Pat. No. 5,475,740 to Biggs, Jr., et al. which discloses a system connected to a central distribution computer that enables a user to access and pay for amenities using a telephone for entering amenity identification and billing information. A billing database is connected to the central distribution computer for validating entered billing information.

U.S. Pat. No. 5,383,113 to Kight et al. and U.S. Pat. No. 5,283,829 to Anderson are both directed to a method for paying bills electronically. According to U.S. Pat. No. 5,383,113 to Kight et al., a computerized payment system is implemented by which a consumer may instruct a service provider by telephone, computer terminal, or by using another telecommunications technique to pay various bills without the consumer being required to write a check for each bill. The service provider collects information from consumers, financial institutions and merchants, and arranges payment to the merchants according to each consumer's specific instructions. Similarly, U.S. Pat. No. 5,283,829 to Anderson discloses an electronic bill payment system and method that includes billing equipment for creating approval records and generating approval numbers for each pre-authorized subscriber. The system also includes an interactive payment approval apparatus into which subscribers dial for approving payment and which determines, based upon information collected, whether to initiate an electronic funds transfer. A series of security checks and comparisons are performed for guarding against accidental and malicious entry of approval numbers.

U.S. Pat. No. 4,908,850 to Masson et al. discloses an information network and method for providing a nationwide audio text network, including electronic billing, that is useful for a wide variety of applications. The system allows for interactive communication with a computer that supplies the network information to a 1-800 caller. The system is also capable of obtaining electronic credit card authorization or charges, and controls routing an incoming call for redirecting the call to a live operator or to other equipment, or to outgoing lines to any desired destination.

In another conventional system, credit cards are used for paying for service representative calls. In this system, each time the caller calls, the caller's credit card account is accessed and a predetermined charge, such as 100 dollars, is authorized and set aside from the caller's credit card available line of credit. The caller then speaks with a service representative. The actual cost of the call is determined at the end of the call, and then transferred to the credit card company in the normal course of business. The charge is then compared to the amount that has been set aside and the difference between the amount that has been set aside and the actual cost of the call is returned to the caller's available line of credit. Unfortunately for the caller, this process usually takes approximately 3 or 4 days. As a result, the portion of the caller's available line of credit that has been set aside is unavailable for other calls or purchases for the approximately 3 to 4 days that it takes the credit card company to reconcile the authorized amount and the actual amount of the call.

Despite these conventional billing arrangements, there still remains a need in the art of providing services to call-in callers with more efficient payment authorization and billing arrangements.

II. SUMMARY OF THE PRESENT INVENTION

The present invention provides an efficient payment authorization and a billing arrangement for a telephone call between a caller and a service representative, and to call limiting, blocking, fraud control associated with such a telephone call.

The advantages of the present invention are provided by a method of billing a telephone call between a caller and a value-added service in which a request is received from a caller for a telephone call between the caller and a value-added service. Information associated with a credit account is requested before the caller is connected to a value-added service, and the information associated with the credit account is received in real time. According to the invention, the information associated with the credit account can be credit card information, debit card information, checking account information, electronic funds transfer information, a telephone number, a cable television account, or a utility service account. Credit account information is communicated to a payment authorization database, which can be located locally or remotely. When the credit account information relates to, for example, a credit card, the credit account information includes the received information associated with the credit account and a predetermined amount that is to be set aside in the credit account. Alternatively, the credit account information includes the received information associated with the credit account and a predetermined amount that is to be charged to the credit account. Payment authorization information associated with the credit account is received from the payment authorization database before the caller is connected to the value-added service, and the caller is connected to the value-added service when the payment authorization information is affirmative. A total charge for the telephone call is calculated when the telephone call is terminated based on an actual time that the caller is connected to the value-added service. Preferably, the charge for the telephone call is based on a per minute rate. Call charge information associated with the telephone call is transmitted to the payment authorization database when the telephone call is terminated. Accordingly, the call charge information includes information for charging the credit account an amount representing a charge for the telephone call.

According to one aspect of the invention, when the credit account information relates to, for example, a credit card, the credit account information includes an authorization of a predetermined amount, and the call charge information includes information for reversing the authorization of the predetermined amount and for reauthorizing the credit account the amount representing the charge for the telephone call. Alternatively, the call charge information is a credit representing an amount that is the predetermined amount minus the amount representing the charge for the telephone call.

The present invention also provides a method for controlling telephone call access to a valueadded service in which a request is received from a caller for a telephone call between the caller and the value-added service. Information associated with the caller is also received, and a database is accessed. The received information associated with the caller is compared with information stored in the database, and the caller is connected to the value-added service when the received information associated with the caller passes the comparison with the information stored in the database. The telephone call can be blocked or limited based on different criteria, such as a frequency of telephone calls from the caller during a predetermined period of time, a predetermined time of day that the call is received, an amount of money spent by the caller during a predetermined period of time, a length of telephone calls during a predetermined period of time, an identity of the caller, credit account information of the caller, personal information of the caller, and/or a caller billing address.

DETAILED DESCRIPTION

Figure 1:
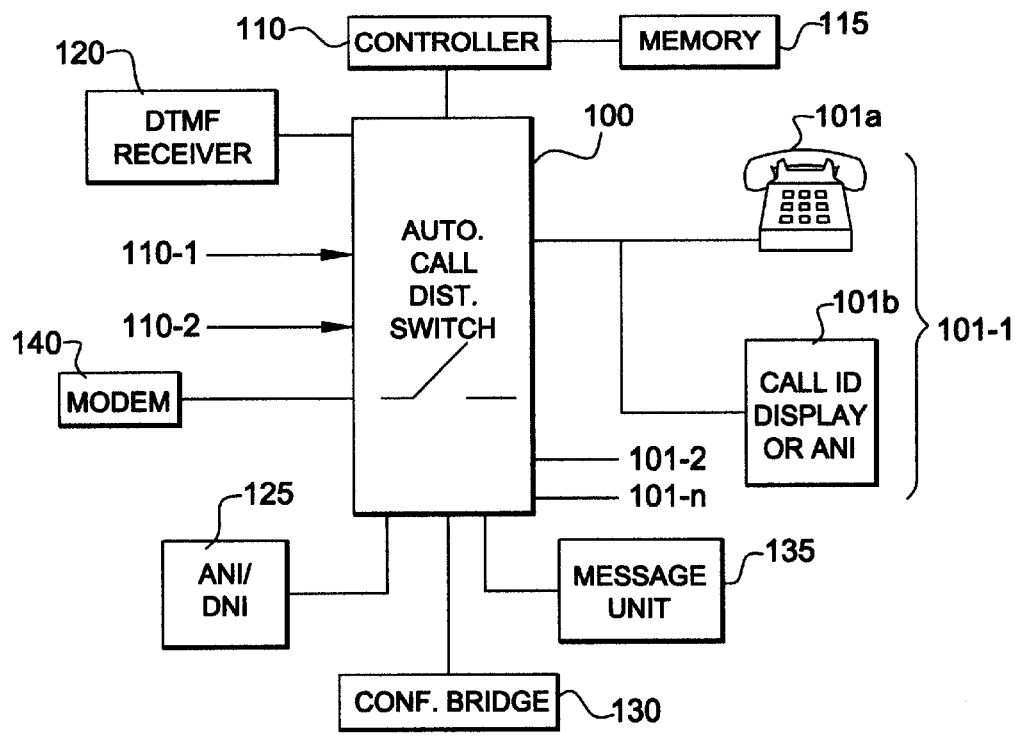
FIG. 1 shows a schematic block diagram for an automatic call distribution system that is programmed to operate according to the present invention.

FIG. 1 shows a schematic block diagram for an automatic call distribution (ACD) system that is programmed to operate according to the present invention. An exemplary ACD system that is suitable for the present invention is disclosed by U.S. Pat. No. 5,802,156 to Felger, which is incorporated by reference herein. An ACD system provides switched network access to a plurality of service representatives or agents. Such ACD systems may vary from manufacturer to manufacturer, but according to the present invention, such an ACD system operates under common-control of a controller 110. The ACD system of FIG. 1 includes a switch 100 that is connected to a plurality of service representatives, or agents, that operate from service representative positions 101-1 through 102-n. ACD 100 redirects calls (circuit-switched voice and data) to any of service representative positions 101-1 through 102-n.

A service representative position, such as position 101-1, can include a remote dial-up terminal 101a that has a caller identification display 101b. Alternatively, a service representative position can be a conventional service representative position, such as position 101-2, that includes such equipment (not shown) as an operator headset, a cathode ray tube display, a computer system and automatic number identification/name display. Accordingly, such a service representative position operates as an extension line for the ACD system. As yet another alternative, a service representative position may include an intelligent telephone terminal, a personal computer or other intelligent terminal known in the art (not shown).

Figure 2:
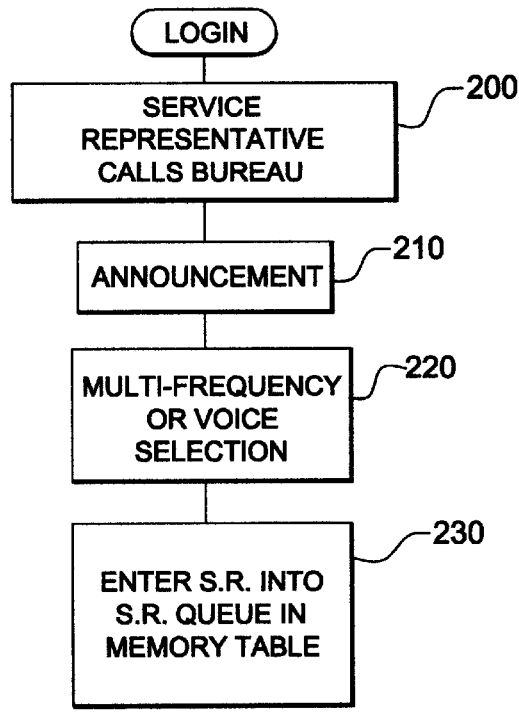
FIG. 2 shows a flowchart of the sequence of operations for logging a service representative into a service representative availability queue according to the present invention.

A service representative at a service representative position indicates availability for providing service to callers by performing a log-in procedure, such as that shown by the flowchart of FIG. 2, which will be further described herein. A caller requesting service is handled according to the flowchart of FIG. 3, which will also be further described herein.

A plurality of service circuits and devices are connected to switch 100 that provide various signaling, data input, data output, conferencing and other services. Such service circuits and devices include, but are not limited to, a dual tone multi-frequency (DTMF) receiver and decoder 120, an automatic number identification (ANI), a dialed number identification (DNI) circuitry 125, an audio response (message) unit 135, a conference bridge circuit 130 and a modulator/demodulator circuitry (MODEM) 140. One or more of each type of these service circuits and devices are typically provided, with the number depending on their respective frequency of use.

Each service circuit or device is called into play by controller 110 in accordance with call processing and control programs stored in a memory 115. One control program residing in memory 115 is a real time of day, day, month and year clock that is accurately maintained by, for example, periodic satellite update and must be preserved even in the event of a local power loss to the system. Another program is a translation program that may be needed for translating a called telephone number to an advertising source or for translating an extension number of a service representative to a remote telephone number for remote dialing, when required.

DTMF receiver and decoder 120 is especially important for receiving information, such as zip code, address, credit card number, bank account number, name input, command and signals for the system of the present invention for caller control and system control to the extent of at least providing service, call blocking, call limiting, fraud control and payment and billing features. Audio response (message) unit 135 preferably includes an audible announcement capability for querying a caller and a connection to DTMF receiver/decoder 120 for receiving and decoding input data entered via a telephone keypad in response to an announcement query. Alternatively, DTMF receiver/decoder 120 and other input circuits may be replaced by speech recognition and other automatic input devices. Modem 140 automatically forwards form-of-payment data to a credit agency or bank under control of controller 110, and receives authorization in real time for a payment or a charge to an account. Modem 140 may comprise a network data mover (NDM) modem or a remote job entry (RJE) modem. Once a call to a service representative is terminated, modem 140 communicates call charge information to a remotely-located billing agency (not shown).

Callers call on lines 110-1 and 110-2, which are representative of lines/trunks connecting ACD 100 to a telephone switching center. A number of different telephone numbers identified to the lines/trunks at a telephone central office (not shown) may be used for identifying the source of advertising or other source by which a caller learned of the existence of the call-in service. Typically, signaling information is provided in advance of a call on the same or a different line. The signaling information includes the address of the calling party and may also include the called address. A dialed number identification/automatic number identification (ANI/DNI) unit 125 identifies the dialed number for determining, for example, the source by which a caller learned of the service. ANI/DNI unit 125 also indicates the calling telephone number for subsequent comparison with a telephone number entered through a telephone keypad by the caller in response to a request generated by audio response (message) unit 135 once the call has begun or for comparison with negative databases, as will be further described herein.

Briefly and according to one embodiment of the present invention, a toll, an 800 or 900 telephone number may be used for connecting a new caller to a single service representative in an available service representative at, for example, a psychic network service. A second telephone number may be used for identifying a psychic twins service, such that two service representatives are connected simultaneously to a caller through a dual representative service representative availability queue. A third number is used for a three service representative call, and so on. In a preferred embodiment of the present invention, a caller is handled according to a call processing algorithm shown in FIG. 3, which is described subsequently herein.

Conference bridge 130 may include automatic dialing equipment for dialing a telephone number for a service representative. Alternatively, automatic dialing circuits (not shown) may be separately provided. Of course, in accordance with the present invention, a plurality of service representatives are simultaneously connected to a caller desiring such service and automatic dialing circuits may or may not be needed in a particular conference call, depending on whether the service representative is directly connected to ACD 100 as an extension or must be "dialed-up." Ringing circuits (not shown) transmit ringing signals toward a service representative, but according to the present invention, audible ringing is not provided the caller. The service representative is connected at the time the service representative goes off-hook.

FIG. 2 shows a flowchart of the sequence of operations controlled by controller 110 when actuating and entering a service representative into a service representative availability queue according to the present invention. The overall procedure of FIG. 2 is performed whether the service representative is accessing the service bureau through a circuit-switched telecommunications network. At step 200, a service representative calls the service bureau and indicates the availability of a service representative for providing service. Of course, when the service representative is directly connected to switch 100, such as by a private dedicated line, the calling service representative may need only to merely pick up the phone or log on, respectively. Whether or not the calling service representative is connected via a dedicated line, the extension or telephone number is automatically recognized by controller 110, for example, through automatic number identification circuit 125.

An audio response unit 135 is connected to the service representative at step 210. Typically, the time of day and date is recorded in memory 115 via controller 110 recording the time and date that the service representative has offered to begin servicing callers. The service representative receives a programmed announcement at step 210 querying the service representative to identify certain choices and preferences for recording in memory 115. For example, a pair of psychic twins may prefer to offer services together to a caller. That is, a service representative A may request to only be connected in a psychic dual-conferencing call with a specific psychic twin service representative B. Other preferences may be predetermined or entered for the first time, such as the service representative's name, address, billing rate, Zodiac birth sign and/or other information, preferably automatically via a telephone keypad or via speech recognition. In another embodiment involving computer service assistance, a service representative may specify expertise in hardware matters and another service representative may specify expertise in software matters.

In an alternative embodiment, the service representative is equipped with a cathode ray terminal, a printer or other display and a fall keyboard permitting a written query and response and so the "announcement" of step 210 may be a written or a displayed announcement. In a preferred embodiment, however, an exemplary announcement or instructional display provided by either embodiment may include: "Press 1 if you wish to serve one call at a time by yourself. Press 2 if you wish to confer with a second conferee on each incoming call. Press 3 if you wish to confer with two other conferees on each incoming call requesting service . . . " and so on. When the service 165 representative has a computer mouse, the mouse may be used to input selection criteria.

Flow continues to step 220 where a preference selection is made. Steps 210 and 220 are repeated until log-in is complete. Once the responses to the queries of step 210 are registered by DTMF or other data receiver 120 and reported to controller 110, ARU 135 may provide a validity check for the entered data and provide audible feedback for selections. Then, ARU 135 may further request, "Do you have a preference for the second conferee? If so, enter by pressing keys of the keypad the first several letters of the preferred conferee's last name." Of course, a psychic twin would enter their own last name and their twin could be immediately identified via a memory lookup in memory 115. Audible or visual confirmation/feedback that the choice has been accepted may be provided, in additional to error algorithms can be provided, as necessary. for correcting an erroneous choice made by a service representative.

In the log-in process of FIG. 2, the various announcements and responses of steps 210 and 220 can be varied depending on the desired service to be performed. Moreover, the result may vary. In one scenario, there may be an availability queue of available service representatives willing to confer with a caller individually or with other conferees. In other words, the service representative may be willing to accept any request for services. In other embodiments, there may be availability queues formed in memory 115 for individual service representative calls, dual or twins calls, triplets or three service representative calls and so on. Or there may be a combination of such queues depending on the embodiment. Consequently, in its simplest embodiment the present invention involves the service representative logging in to a dual service representative availability queue so that upon receiving a call to a special dual service representative telephone number, the next two service representatives that are available in the dual service representative availability queue are automatically and connected practically simultaneously to the caller.

The result of the log-in process is shown as step 230, that is, the service representative is entered into memory 115 in one or more service representative availability queues as a memory table. Of course, when a service representative takes a call and is connected with a caller (and maybe one or more other service representative conferees), the appropriate availability table in memory 115 records a "busy" status for the service representative, as signaled by controller 110. Moreover, the service representative has recorded the preferred type of call that the service representative is willing to accept (for example, individually, with another service representative conferee, and the like) and certain other preferences, such as their own Zodiac sign, the day, month, year of birth, gender or other information that is useful for arranging a call. Some or all of this information may be preserved in memory 115 depending on the service offered. Over time, information such as the number, type, caller identities, caller preferences and the like of calls handled by each respective service representative may be recorded in memory 115 and associated with the service representative for assisting in providing better caller service, and for providing salary or other compensation to the service representatives.

Figure 3:
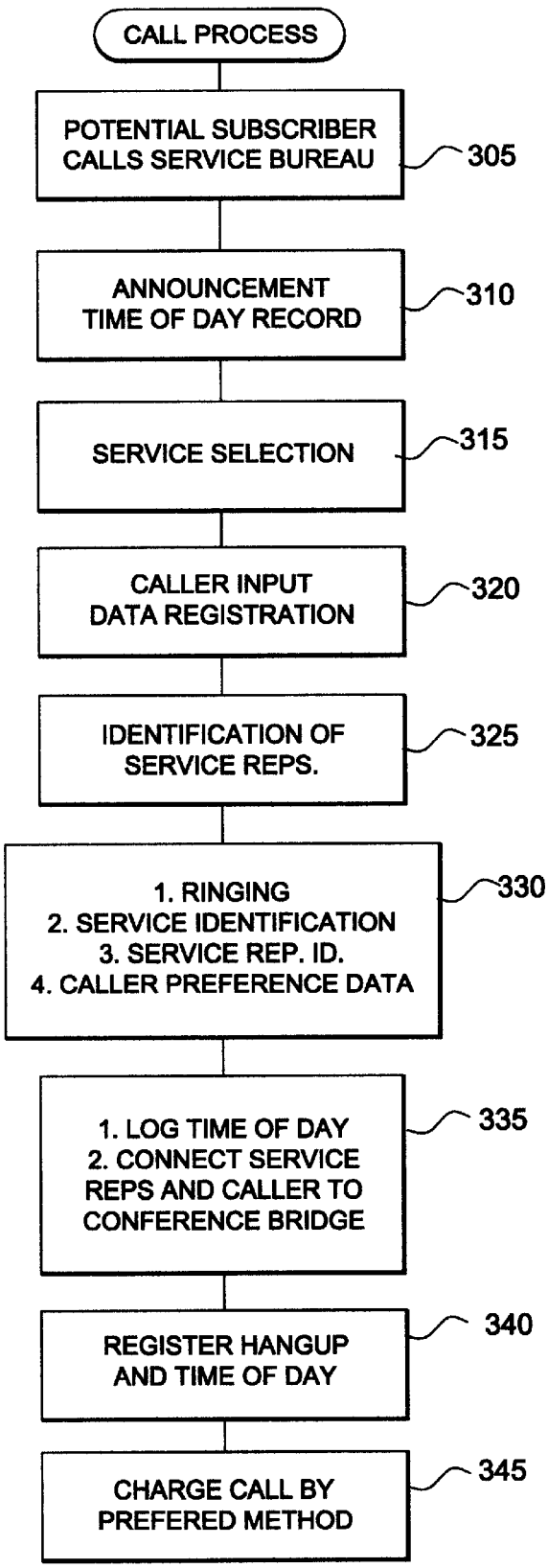
FIG. 3 shows a flowchart for processing a call for a service representative according to the present invention.

FIG. 3 shows a flowchart for processing a call received from a circuit-switched telecommunications network for a service representative according to the present invention. A caller may define certain parameters for the ACD system of FIG. 1 to follow when connecting the caller to at least one service representative. At step 305, a caller to the psychic network service calls an 800 or a 900 telephone number for the service bureau on line 110-1 or series of trunks 110-1 and 110-2. A second line or a series of trunks may be separately provided for a twins service. In such an instance, the caller may be immediately passed to step 320 and the input data registered including, but not limited to, the calling telephone number, address and billing information of the caller.

According to the present invention, call limiting, call blocking and fraud control checking is performed automatically at this stage. For example, call limiting criteria may be established for protecting callers against excess usage and billing, such as a predetermined number of calls per day, a predetermined number of call minutes per day, week or month, a predetermined time period or time slot, such as between 8:00 a.m. to 9:00 p.m., and/or an amount of money spent by a caller during a predetermined period of time. A caller is queried in a database for determining how frequently the caller has called, whether there is a time constraint for the caller, and, for each respective call, how long the caller was connected for determining whether any individual or combination of the call limiting criteria have been exceeded. When any call limiting criteria has been exceeded, the caller may receive a message thanking the caller for their previous calls, and possibly blocking or limiting the duration of the present call.

Regarding call blocking based on input data and certain negative databases, the calling telephone number, the originating area code of the call, the central office identification of the originating telephone number (i.e., the first three numbers of a seven number telephone number), the first several digits of the address or apartment number and/or the zip code of the caller that have been entered by way of a telephone keypad may be matched against the calling telephone number (obtained via ANI) and/or credit card data so that a security breach is pre-identified. The comparison of the caller-entered first several digits of a street address or apartment number and/or zip code against credit card data downloaded or prestored from a credit agency or a bank is referred to herein as an address verification system (AVS). The caller may be asked to explain any discrepancy and/or the call is blocked. The caller can be allowed to enter the information a predetermined number of times, for example, three times, in case the call inadvertently keyed in an error. If the requested information is not correctly entered in the predetermined number of times, the call can be blocked. The calling telephone numbers (obtained via ANI and by caller entry) can be checked against each other and against telephone number negative databases that identify pay phones, prisons, schools, selected commercial establishments, and other institutions or locations of telephones from which calls may be blocked at switch (router) 100.

A voiceprint of the caller's voice may be recorded via message unit 135 and converted to digital form for comparison against a voiceprint database for insuring the validity of the identity of the caller. The caller's name may be spelled into the system via a telephone or intelligent terminal keypad, and compared against a card-holder or account name as a security check. At least, via AVS, the address of the caller, entered by telephone keypad, can be matched against the address of the card holder or on an account that is pre-stored and downloaded from a credit agency or a bank. In an alternative embodiment, a non-service representative may assist, supplement or replace an automated system regarding call limiting, call blocking, fraud control, collecting form of payment information and obtaining payment authorization.

At step 325, the caller is identified to be served by at least one service representative and at step 330 immediately connected to an identified service representative listed in the availability queue of service. Once it has been determined that call blocking, call limiting and fraud control criteria have not been exceeded, a caller is immediately connected and served by at least one service representative listed in the service representative availability queue.

In a further preferred embodiment of the present invention, steps 310 and 315 performed repeatedly in a manner that is similar to the way the service representative logs in, as per FIG. 2, until the caller logs in. For example, at step 310, an announcement is played welcoming the caller to the service bureau, such as to a psychic network service. When the service representative queue is relatively full, the announcement can indicate that the caller's call is important and connection to a service representative be momentarily delayed. Based on controller calculated average call durations and other queuing theory calculations, controller 110 may even indicate an expected waiting time for the caller and, in the meanwhile, will begin to record certain service and service representative preference information.

While the caller is waiting for a service representative, the caller may be provided with their horoscope or other information of interest to the caller until a service representative is available to conduct a call with the caller. For example, a caller may enter the month, day and year of birth, their gender and service preference (such as one or more service representative conferees). This information may be used for providing a personalized horoscope or other information that may be of interest to the caller while the caller is waiting for a service representative.

As steps 310 and 315 are repeated, controller 100 variously calls into play ARU 135, ANI 125 and DTMF receiver/decoder 120, as necessary. Controller 100 may query a database for determining billing arrangements, among other things, such as whether the caller has used the service before, how the caller has paid in the past, what preferences and data was accumulated at that time, and bring such data that is useful for this call to active memory.

Once the call has been accepted and the caller has logged in, the caller's input data is registered into active memory 115 at step 320. The registered data may include, among other things, the caller's name, address, zip code, telephone number, credit card type and number, bank name and account number and billing data, service preference, and data that may be used for matching the caller with service representative data. For example, the caller's sign of the Zodiac, determined from an entered birth date, or separately entered, may be matched with similar psychic service representative information before the call is initiated.

Identification of service representatives at step 325 then may be as simple as selecting the next available service representative from an availability queue and associating the selected service representative with a caller. In a dual service representative call (twin service), the next two available service representatives are selected from the availability queue for a call, and so on. Service representative selection can be more complicated when, for example, a pair of psychic twins is required to be identified and selected. Other criteria for selecting a service representative can include gender, sign of the Zodiac and other preference data. In all such criteria selection and matching of preferences, step 325 is crucial for obtaining the best service for a particular caller. A trade-off is that there may not be as many available service representatives having desired criteria, so that a delay in arranging a call may be lengthened or impossible to accomplish at a particular time. Announcement 310 may be adaptively used for describing for the caller the real choices that the caller is able to make at a particular time under control of controller 110. The caller may be offered additional choices within the same network, or through prior arrangement with another psychic counseling network service, the caller may be transferred to an available psychic representative associated with another psychic network service for receiving service.

Once the service representative goes off-hook, the caller is billed for the call. Consequently, at step 335, all caller and service representative data is logged in along with time of day and date for calculating call duration in minutes and for billing, and service representative compensation data logging. More specifically, a caller is billed for the duration of time beginning when the first service representative goes off-hook until the last service representative goes on-hook. Individual time logs are maintained for the caller (call duration) and each service representative (service duration). For example, when the first service representative hangs up, the system will update the database with the first service representative's connect time, time of day and the date. When the second or final service representative hangs up, the caller is billed for the total call time and the second service representative's connect time, time of day and date are logged accordingly.

Once the conferees (including the caller) have completed a call, step 340 is entered. On-hook conditions and the time-of-day are registered by controller 110 so that the duration of the call can be calculated. Each of the service representatives are returned to their respective availability queues until they choose to log off by following a log-off process that is complimentary to the log-in process of FIG. 2, or become unavailable by accepting a service call. Once a service representative logs in, controller 110 anticipates that the next call to the service bureau is a log-off call and will provide an appropriate sequence of announcements and obtain responses for logging off. The time of day may be recorded to determine how long the service representative has been on the job.

When the counseling service is provided for a fee, it is anticipated according to the principles of the present invention that callers may be offered a variety of ways to pay for the services offered. Some methods of payment, such as debit cards, bank checks or drafts, smartcards, electronic wallets (e-wallets), and major credit cards, are more creditworthy than other methods of payment. Other forms of payment contemplated by the present invention include billing to a telephone number, a cable television account number, or a utility service account. A caller enters a preferred form of payment in response to a request via ARU unit 135. A caller may receive preauthorization using these credit arrangements in real time, even prior to the counseling service and, consequently, may realize a discount according to the present invention, which can induce the caller to use a method of payment that is preferred by the service vendor. Payment method and billing arrangements are typically agreed upon after the call limiting, call blocking and fraud control features previously described, and may be agreed upon in advance of the call or prior to conclusion of the call. Preferably, such arrangements are agreed upon automatically by using message unit 135 and data input 120, as described above, when modem 140 is used for obtaining the payment authorization from a bank or credit agency.

Figure 4:
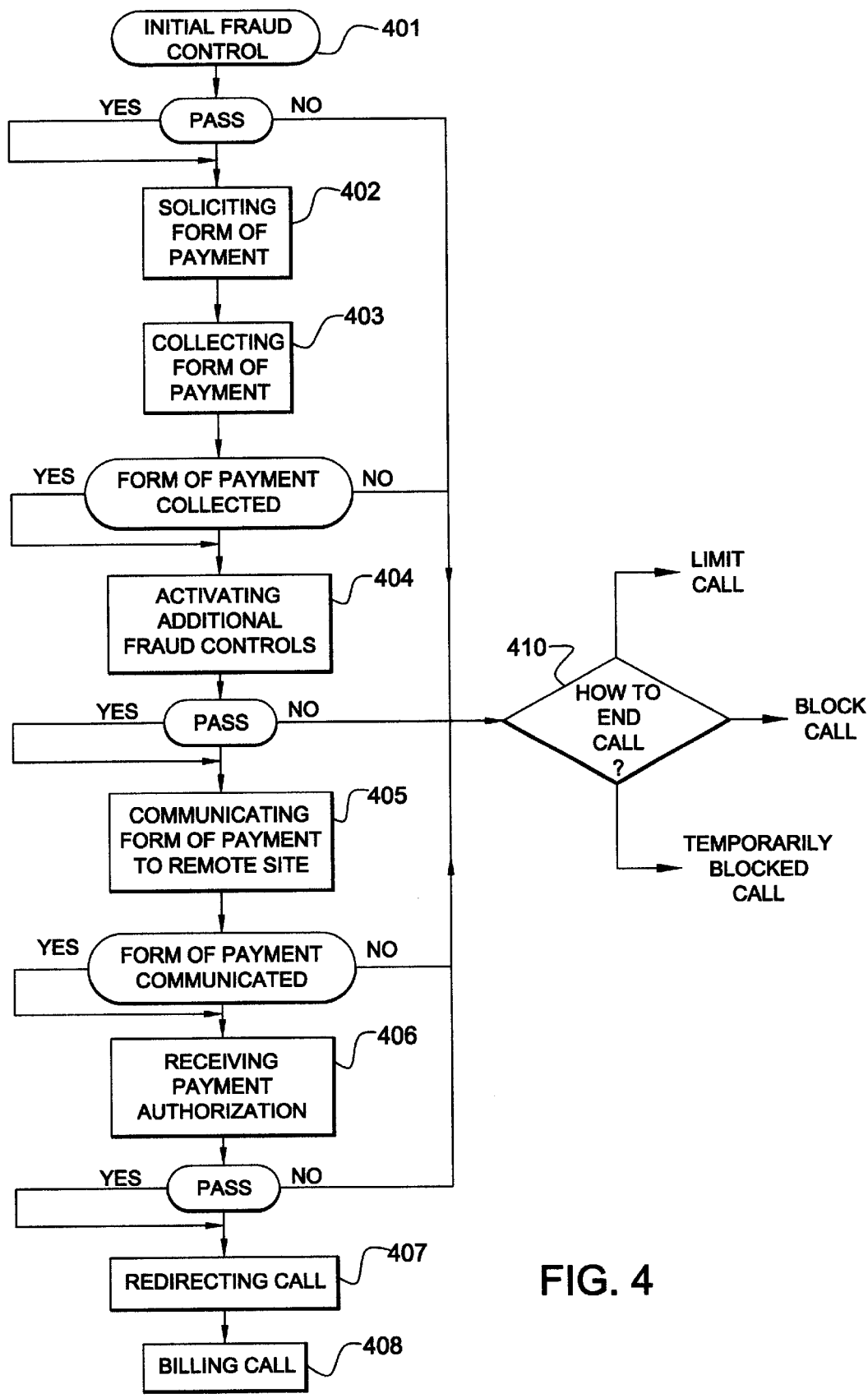
FIG. 4 shows a flow diagram for a real-time billing system for telephone calls in accordance with the principles of the present invention.

FIG. 4 shows a flow diagram for a real-time billing system for circuit-switched calls in accordance with the principles of the present invention. At block 401, the initial fraud control are activated, which can include verifying whether the caller is calling from a location that matches the originating telephone number of the call, limiting the number and duration of calls made during a certain time period and/or limiting the amount of money a caller spends on service representative calls in a predetermined time period.

When a call is received from a circuit-switched telecommunications network, the system prompts the caller at block 401 to enter the caller's telephone number to verify that the caller is calling from a location that matches the telephone number from a displayed ANI. When the entered telephone number does not match the number forwarded by the ANI, the caller may be disconnected or the caller may be given a predetermined number of chances to reenter the correct telephone number.

When the originating telephone number entered by the caller is verified to match the ANI forwarded with the call, the initial fraud control of block 401 verifies that the caller's telephone number is not stored in a negative database of known bad telephone numbers. The negative database can be located locally in memory 115 or located remotely and accessed via a modem or over the Internet. Telephone numbers stored in the negative database result from insufficient payment of a telephone bill or a credit card charge, or a caller's refusal of payment relating to a disputed charge from a previous service representative call. The present invention, however, is not limited by the above-mentioned negative database satisfying the criteria mentioned above (storing telephone numbers having disputed charges or insufficient payments with respect to a service representative call). The negative database used at this stage of the initial fraud control of the present invention may be a shared database that stores telephone numbers of callers who have credit problems with other types of telephone.

The present system also checks to ensure that calls are not made from locations in which the telephone number cannot be forwarded to, for example, a Caller ID or other device that displays and/or records the telephone number of the incoming call. In particular, certain parts of the United States cannot read ANIs and calls originating from telephone numbers located in these areas are detected by the initial fraud control of block 401. The present invention is also capable of detecting calls from particular institutions and communication devices, such as cellular telephones, particular area codes, particular central offices of a particular area code (i.e., the first three numbers of a seven number telephone number), area code numbers associated with a PBX system, governmental facilities, pay telephones, prisons, hospitals, schools, selected commercial establishments, etc.

The above-described initial fraud controls are illustrative examples. Other fraud controls will be apparent to those skilled in the art, thus the invention is not limited to the fraud controls described above. In general, the system can be designed to prevent any unwanted telephone number from entering the system.

When the originating telephone number entered by the caller is verified to match the ANI forwarded with the call and the originating telephone number is not contained in the negative database, the initial fraud control of block 401 checks that the caller has not exceed a permissible number or duration of calls the caller has made during a predetermined period of time, or an amount of money the caller has spent during a predetermined period of time by querying a database. For example, a caller may be limited to only two calls per day or two calls per week, and the to duration of calls may be limited so that a caller is allowed to speak with service representatives for a maximum of, for example, 100 minutes per month. The amount of money that a caller can spend can be limited to, for example, an expenditure of $100 per month. The database containing this type of information can be part of or separate from the negative database, and can be a shared database.

Calls that fail the initial fraud control of block 401 are forwarded to block 410 where the call is processed to determine what the next course of action will be. According to the invention, calls can be blocked, temporarily blocked or limited. Blocked calls are permanently prohibited from connection with a service representative. A message may be played for a blocked call that advises the caller to stop calling because the calling number has been blocked. Examples of potentially blocked calls include calls from telephone numbers located in a negative database, particular area codes, particular central offices within particular area codes or calls from localities where an ANI cannot be forwarded.

A limited call prohibits a caller who has exceeded an allotted number of calls, an allotted duration (in minutes, hour or days) of calls, an allotted time slot or an allotted expenditure amount during a certain period of time from being connected to a service representative. The limitations placed on a given caller may be removed once the caller has satisfied criteria for removing the limitation. A temporarily blocked calls can include a call in which a telephone number requested by a service representative does not match an ANI number displayed. The caller may be able to reenter the correct telephone number, or may be allowed to call again for correctly entering the caller's telephone number. Therefore, the caller is temporarily blocked from being connected to a service representative. When any of the call limiting, call blocking, or temporarily call blocking features is activated, the call is disconnected.

When the call successfully passes the initial fraud control of block 401, the call then advances to block 402 where the form of payment that will be used to pay for the call to a service representative is solicited. The caller is prompted by, for example, a computer-activated voice or by an operator (a non-service representative), to indicate the form of payment information the caller wishes to use. The form of payment can be cash, debit cards, check or electronic draft, electronic funds transfer, credit, major credit card, electronic wallet and the like. For this particular embodiment of the invention, the preferred form of payment involves credit cards, debit cards and the like.

Alternatively, in situations when the caller has previously called into the service, the form of payment information can be automatically accessed from a form-of-payment/credit database in a well-known manner based on the ANI and/or other information that has been provided by the caller. Preferably, the form-of-payment/credit database is stored locally, but can also be remotely located. The previously-used form of payment information stored in the form-of-payment/credit database is presented to the caller in a well-known manner as a possible selection by the caller for payment of the current call.

The operator or computer-activated voice may offer the caller a discount when the form of payment selected by the caller is convenient for the billing system. A further discount may be given when the caller is a frequent caller who has not exceeded the caller's allowance for prescribed calls or expenditure amount. Of course, any other form of preferential treatment may also be initiated. In the exemplary embodiment described in FIG. 4, the caller provides the form of payment information to the operator or inputs this information via a telephone keypad or keyboard. The caller can be requested to enter or supply information such as credit card or debit card numbers, the card expiration date, address including zip code, billing address, date of birth, driver's license number, etc. When the form of payment is not successfully communicated to the operator or successfully entered by the caller via the telephone keypad or keyboard, the call is disconnected. Alternatively, the caller may be temporarily blocked and/or given a predetermined number of chances for entering the correct information. The caller may also be completely blocked from calling the system again.

When the information is successfully communicated or entered, flow continues to block 404 where additional fraud control is implemented. Such additional fraud control may, for example, include comparing information given by the caller against information stored in a database of information related to each respective caller, and/or verifying that the caller's credit card or debit card number has not been in a negative database for delinquent payment. The information stored in this database can be part of or separate from the negative database of call originating telephone numbers, and can be a shared database.

The information entered or communicated by the caller is also used for determining whether the caller has not exceed a permissible number or duration of calls the caller has made during a predetermined period of time, or an amount of money the caller has spent during a predetermined period of time by querying a database. The queried database may be the same database used in step 401 for determining whether the caller has exceeded any of the same criteria.

When a call fails the additional fraud control of block 404, the call is forwarded to block 410 where the call can be selectively blocked, temporarily blocked, or limited. A blocked call includes a call in which a credit card or debit card has expired or is invalid. A limited call includes a call in which a credit card or a debit card exceeds the monthly/weekly allocations of calls or exceeds the time allowance for a certain period of time. A temporarily blocked call includes a call in which the zip code or other information supplied by the caller does not match the appropriate information stored in a database and a call that is received outside of an allowed time slot for the caller. Moreover, the system can be designed so that calls classified as blocked calls can also be classified as temporarily blocked calls when the system allows a caller to supply information, such as the correct expiration date of a charge card. When the caller is allowed to make payment to a lending institution in order to validate the credit or debit card, a call can be classified as temporarily blocked.

According to one embodiment of the present invention, when the call passes the additional fraud control, the credit card account information or the debit card account information is forwarded at block 405 to a remote site for authorization. Remote sites used for authorization may, for example, include a credit bureau, a banking institution, a third-party biller, or the like. The remote site checks to ensure that the credit card or debit card is valid. When the card is valid, a predetermined amount of money is charged against the credit or debit card account at block 406. According to another embodiment of the present invention, when the call passes the additional fraud control, the credit card account information or the debit card account information is forwarded to a local database to ensure that the credit card or debit card is valid. When the card is valid, a predetermined amount of money is charged against the credit or debit card account at block 406.

The predetermined amount of money charged against the credit account can be performed in several ways. For example, a portion of the caller's available line of credit for the account equal to the predetermined amount can be authorized or set aside for the purpose of making the call. Alternatively, the account may be debited by the predetermined amount. In any event, the predetermined amount of money charged to the account is preferably greater than the probable charge for the telephone call for insuring that the charges incurred during the call will be paid. When the predetermined charge to the account is approved or denied, the remote site sends an approval or denial notification back to the system at block 406. When the remote site authorizes the call, the call is forwarded to a service representative, such as a psychic counselor. When the call is not authorized, the call is either blocked or temporarily blocked until information regarding the credit bureau or the banking institution is settled by the caller.

At block 407, the call is redirected to a service representative and, at this point, the billing processes begin, as shown in block 408. The call is billed from the time the call is redirected to one or more service representatives and to the time when the last service representative hangs up. The caller is billed in real time for only the actual minutes that the caller is connected to a service representative.

When the call is terminated, the system calculates the total billable amount for the call. The system then sends the billable amount to the remote site at block 410. The system can also send the credit card or debit card account information or some other identifying information along with the billable amount to the remote site. The remote site then reverses the previous charge of the predetermined amount to the account and a new charge for the actual billable amount of the call is charged to the account at block 408.

This reverse authorization routine can be performed in several ways and the invention is not limited to the following examples. First, the initial authorization to set aside the predetermined amount of available credit is reversed, thereby returning the amount that was set aside to the available credit line. A second authorization is then performed wherein a portion of the available credit line that is equal to the actual cost of the call is set aside. In another embodiment of the invention, the account may receive a credit in the amount of the predetermined amount to negate the initial charge of the predetermined amount. A new charge in the amount of the actual cost of the call is then made to the credit card account. Alternatively, the account may just receive a credit in the amount of the difference of the predetermined amount initially set aside minus the actual billable amount of the call. Furthermore, when the caller is not connected to a service representative and the billing has not begun before the call is terminated, the caller is not charged for the call and the initial charge is completely reversed. When the credit account information relates to a checking account or an electronic funds transfer, the reverse authorization feature of the present invention is, of course, not used.

The present invention also provides for a call-out feature in which selected callers are called by the system in a well-known manner. Once the call has been connected to the caller, message unit 135 plays an announcement for the call recipient offering services and/or goods that can be accepted. If the offer of services and/or goods is accepted by the call recipient, message unit 135 provides audio prompts querying the call recipient for a form of payment. Accordingly, a previously-used form of payment can be accessed from a form-of-payment/credit database for providing a possible selection by the call recipient. The fraud control features of the present invention can optionally be used in conjunction with the querying for the form of payment Accessing the form-of-payment database When the form of payment is selected, the fraud controls relating to the form of payment provided by the present invention are then initiated before the services and/or goods are delivered.

Figure 5A:
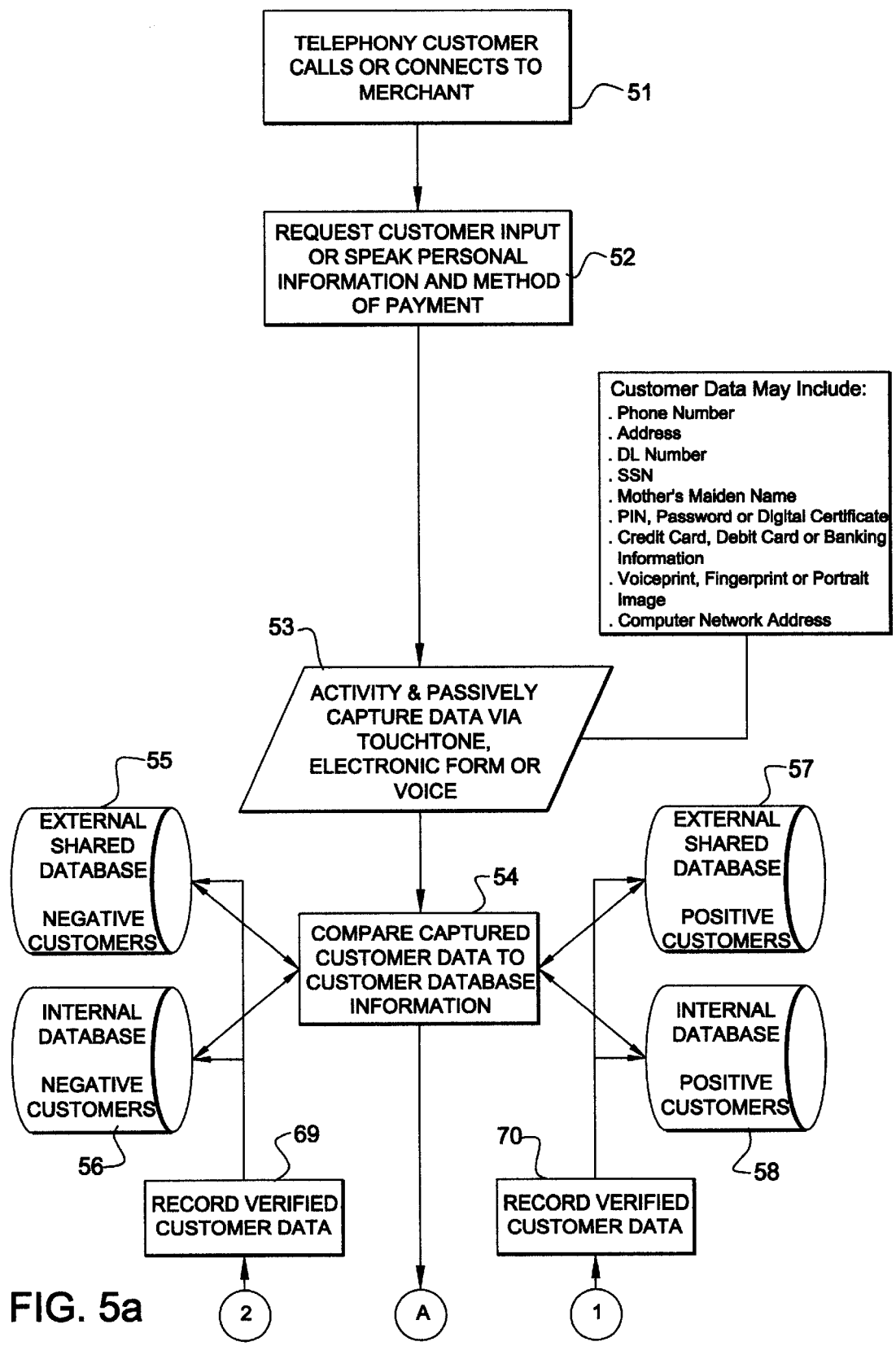
FIGS. 5a–5c show a flow diagram summarizing the real-time billing and fraud control system of the present invention.
Figure 5B:
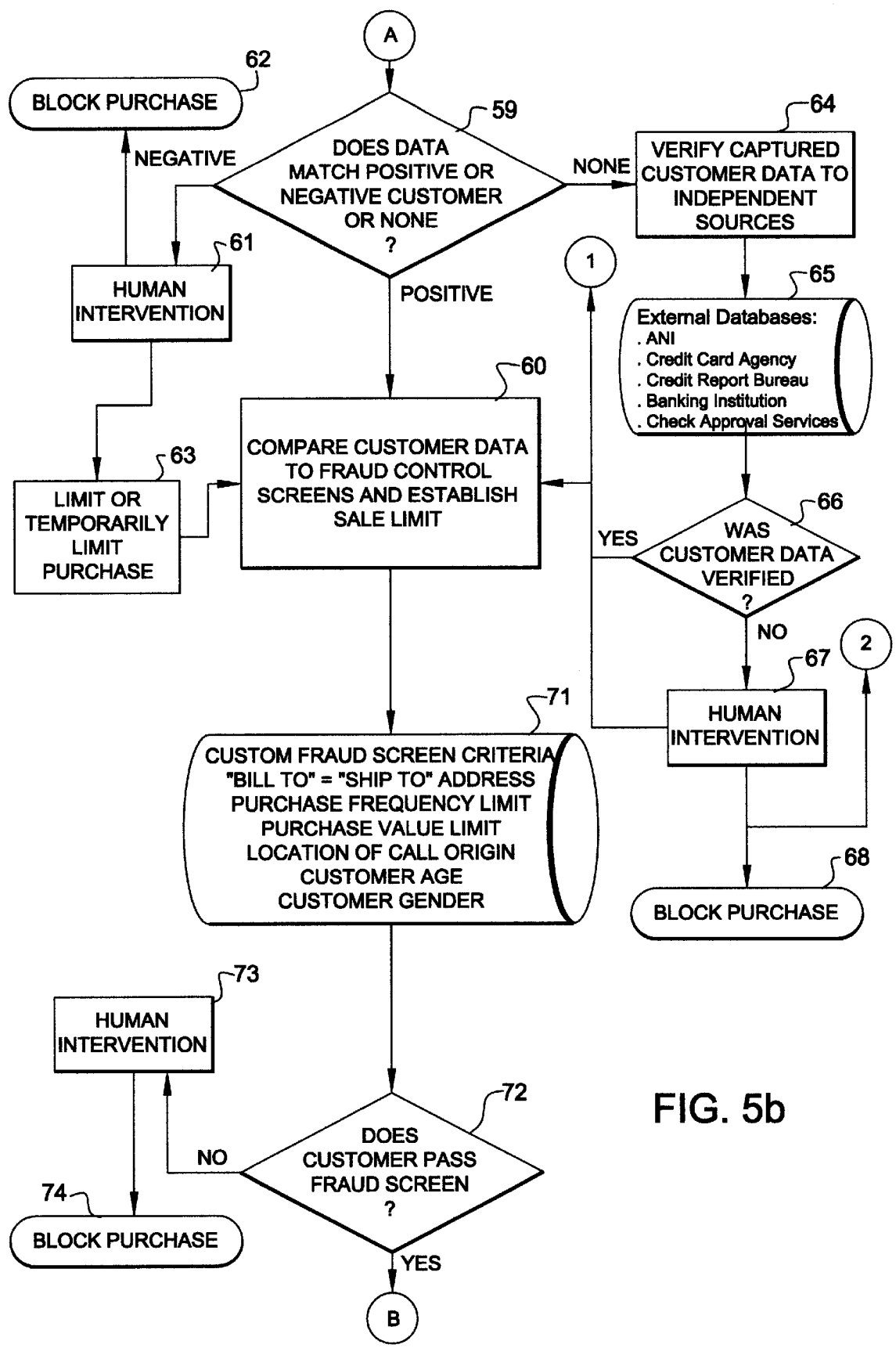
Figure 5C:
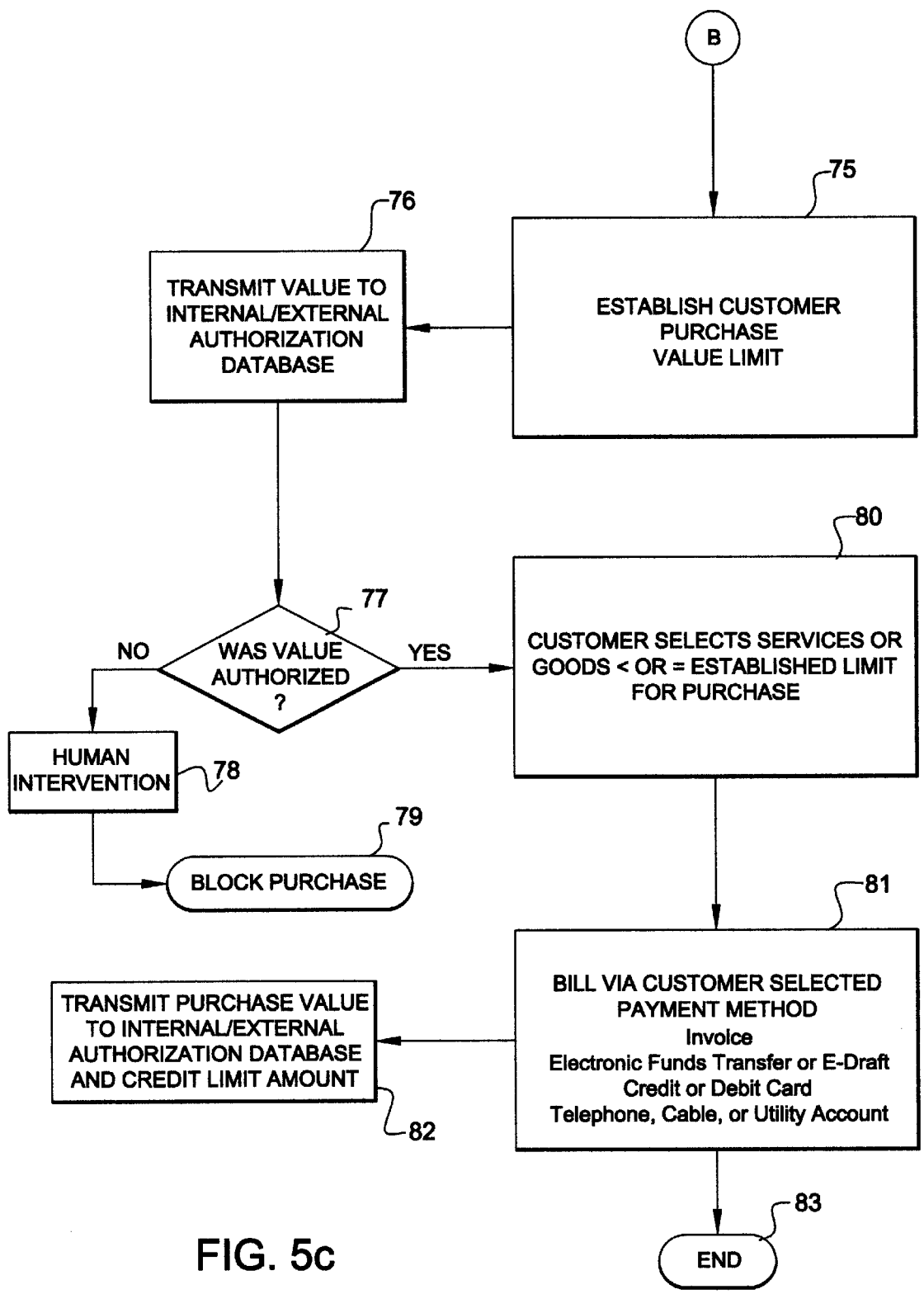

FIGS. 5a–5c show a flow diagram summarizing the real-time billing and fraud control system of the present invention. At step 51, a caller is connected to a service provider providing telephone services. At step 52, the caller is queried for personal information and a method of payment that will be used by the caller. In situations when the caller has previously purchased services, form of payment information can be automatically accessed from a form-of-payment/credit database based on the ANI and/or other information that has been provided by the caller, and presented to the caller for possible selection by the caller. At step 53, the personal information of the caller and the method of payment information that is to be used by the caller are actively and/or passively captured. The personal information of the caller that is captured can include, the caller's telephone number, address, DL number, social security number, mother's maiden name, a PIN, a password, a credit card number, a debit card number, banking information and/or a voiceprint.

At step 54, the captured caller data is compared to information contained in one or more caller databases, such as any of an external shared negative caller database 55, an internal negative caller database 56, an external shared positive caller database 57 and an internal positive caller database 58. At step 59, it is determined whether the captured caller data matches information contained in a positive caller database or a negative caller database, or whether the captured caller data does not match information contained in any of the databases accessed. If, at step 59, the captured caller data matches information contained in a positive caller database, flow continues to step 60.

If, at step 59, the captured caller data matches information contained in a negative caller database, flow continues to step 61 where a service representative can intervene for making a final determination regarding blocking or limiting purchases of the services available for purchase. When the service representative decides to block a purchase based on the available information, flow continues to step 62. When the service representative, based on the available information, decides to limit or temporarily limit a purchase, flow continues to step 63, and then to step 60. Alternatively, flow can proceed to block purchases (step 62) or limit purchases (step 63) based on information available at decision step 59.

If, at step 59, the captured caller information does not match information contained in any of the databases that were accessed, flow continues to step 64 where the captured information is verified at step 65 with independent sources by queries to at least one external database, such as an ANI database, a credit card agency database, a credit report bureau database, a banking institution, and a check approval service. Flow continues to step 66, where it is determined whether the captured caller information was verified. If not, flow continues to step 67 where a service representative can intervene for making a final determination regarding blocking purchases of the services available for purchase. When the service representative decides to block a purchase based on the available information, flow continues to step 68 and to step 69 where the captured information is shared with negative caller databases, such as databases 55 and 56. When the service representative decides to permit a purchase based on the available information, flow continues to step 60 where the caller information is compared to fraud control screening criteria and to establish a sale limit, and to step 70 where the captured information is shared with positive caller databases, such as databases 57 and 58. Alternatively, flow can proceed to block purchases (step 68) based on information available at decision step 66.

At step 60, the caller information is compared to fraud control screening criteria and a sale limit is established. Flow continues to step 71 where caller fraud screening criteria is accessed, such as a bill-to address, a ship-to address, a purchase-frequency limit, a purchase-value limit, a call origin location, the customer age, and customer gender. At step 72, it is determined whether the caller passed the fraud control screening. If not, flow continues to step 73 where a service representative can intervene for making a final determination regarding blocking purchases of the services available for purchase. When the service representative decides to block a purchase based on the available information, flow continues to step 74. Alternatively, flow can proceed to block purchases (step 74) based on information available at decision step 72.

If, at step 72, the caller passes the fraud control screening, flow continues to step 75 where a caller purchase value limit is established. Flow continues to step 76 where the established purchase value limit is communicated to appropriate internal and external databases, such as databases 55–58. Flow continues to step 77 where it is determined whether the customer purchase value has been authorized. If not, flow continues to step 78 where a service representative can intervene for making a final determination regarding blocking purchases of the merchants goods and/or services. When the service representative decides to block a purchase based on the available information, flow continues to step 79. Alternatively, flow can proceed to block purchases (step 79) based on information available at decision step 77.

If the caller purchase value was authorized at step 77, flow continues to step 80 where the caller selects services having a value that is less than or equal to the established limit for the caller. Flow continues to step 81 where the caller is billed by way of the caller-selected method of payment, such as an invoice, an electronic funds transfer, a credit or debit card transaction, a telephone, or a cable or other utility account. The purchase value is transmitted to appropriate internal and external authorization and credit limit amount databases at step 82 and the process is exited at step 83.

The present invention is adaptable for providing video conferencing services to callers equipped with video cameras. Moreover, the service representatives may not necessarily need to depend on central controller 110 for database maintenance services regarding caller and service representative data. Such data may be maintained and updated within personal computers at the service representative's premises. Other modifications and enhancements to the present invention may be adaptively made for providing other services than that described, such as medical counseling, suicide hot-line and other services.

The present invention is also applicable for any value-added telecommunication service, such as a chatroom, a talk line or a pay information service. The steps involved are generally the same as shown in FIG. 4, except that at block 407, the call is redirected to the value-added service.

Any patents or publications referenced above should be deemed to be incorporated by reference as to their entire subject matter should one believe it relevant to obtain details from such sources for explanations of related arrangements and how they may be employed to advantage in the present invention. The present invention should only be deemed to be limited in scope by the claims which follow.

What is claimed is:

1. A method of billing a telephone call between a caller and a value-added service, the method comprising steps of:

receiving a request from a caller for a telephone call between the caller and a value-added service;

requesting information associated with a credit account before the caller is connected to the value-added service;

receiving the information associated with a credit account;

communicating credit account information to a payment authorization database;

receiving payment authorization information associated with the credit account from the payment authorization database before the caller is connected to the value-added service;

connecting the caller to the value-added service when the payment authorization information is affirmative; and transmitting call charge information associated with the telephone call to the payment authorization database when the telephone call is terminated, the call charge information including information for charging the credit account an amount representing a charge for the telephone call.

2. The method according to claim 1, wherein the credit account information includes the received information associated with the credit account and a predetermined amount that is to be charged to the credit account.

3. The method according to claim 1, wherein the credit account information includes the received information associated with the credit account and a predetermined amount that is to be set aside in the credit account for the telephone call.

4. The method according to claim 1, further comprising a step of calculating a total charge for the telephone call when the telephone call is terminated, the total charge being based on an actual time that the caller is connected to the value-added service.

5. The method according to claim 1, wherein the charge for the telephone call is based on a per minute rate.

6. The method according to claim 1, wherein the credit account information includes an authorization of a predetermined amount, and wherein the call charge information includes information for reversing the authorization of the predetermined amount and for authorizing the credit account the amount representing the charge for the telephone call.

7. The method according to claim 1, wherein the call charge information is a credit representing an amount that is the predetermined amount minus the amount representing the charge for the telephone call.

8. The method according to claim 1, wherein the payment authorization database is located locally.

9. The method according to claim 1, wherein the payment authorization database is located at a remote site.

10. The method according to claim 9, wherein the remote site is a banking institution.

11. The method according to claim 9, wherein the remote site is a credit card agency.

12. The method according to claim 1, wherein the step of requesting information associated with a credit account includes a step of presenting the caller with form of payment information that is selectable by the user.

13. The method according to claim 1, wherein the received information associated with a credit account includes form of payment information selected by the caller.

14. The method according to claim 1, wherein the credit account information includes credit card information.

15. The method according to claim 1, wherein the credit account information includes debit card information.

16. The method according to claim 1, wherein the credit account information includes checking account information.

17. The method according to claim 1, wherein the credit account information includes electronic funds transfer information.

18. The method according to claim 1, wherein the credit account information includes a telephone number.

19. The method according to claim 1, wherein the credit account information relates to a cable television account.

20. The method according to claim 1, wherein the credit account information relates to a utility service account.

21. The method according to claim 1, wherein the step of receiving payment authorization includes the step of verifying an address of the caller.

22. The method according to claim 1, wherein the step of receiving payment authorization includes the step of verifying a zip code of the caller.

23. The method according to claim 1, further comprising a step of determining whether the telephone call passes fraud control before the step of requesting information associated with the credit account.

24. The method according to claim 23, wherein the step of requesting information associated with the credit account is performed when the telephone call passes the fraud control.

25. The method according to claim 1, further comprising a step of limiting the telephone call based on a frequency of telephone calls from the caller during a predetermined period of time before connecting the caller to the value-added service.

26. The method according to claim 1, further comprising a step of limiting the telephone call based on an amount of money spent by the caller during a predetermined period of time before connecting the caller to the value-added service.

27. The method according to claim 1, further comprising a step of limiting the telephone call based on a length telephone call during a predetermined period of time before connecting the caller to the value-added service.

28. The method according to claim 1, further comprising a step of blocking the telephone call based on an amount of money spent by the caller during a predetermined period of time.

29. The method according to claim 1, further comprising a step of blocking the telephone call when the telephone call does not pass fraud control based on call origination information for the telephone call.

30. The method according to claim 1, further comprising a step of limiting the telephone call when the telephone call does not pass fraud control based on call origination information for the telephone call.

31. The method according to claim 1, further comprising a step of blocking the telephone call when the telephone call does not pass fraud control based on a caller identification.

32. The method according to claim 1, further comprising a step of limiting the telephone call when the telephone call does not pass fraud control based on a caller identification.

33. The method according to claim 1, further comprising a step of blocking the telephone call when the telephone call does not pass fraud control based on a credit account associated with the caller.

34. The method according to claim 1, further comprising a step of limiting the telephone call when the telephone call does not pass fraud control based on a credit account associated with the caller.

35. The method according to claim 1, further comprising a step of blocking the telephone call when the telephone call does not pass fraud control based on a caller billing address.

36. The method according to claim 1, further comprising a step of limiting the telephone call when the telephone call does not pass fraud control based on a caller billing address.

37. The method according to claim 1, further comprising a step of blocking the telephone call when the telephone call does not pass fraud control based on personal information of the caller.

38. The method according to claim 37, wherein the personal information of the caller includes at least a portion of at least one of a driver's license number, a social security number, a mother's maiden name, and a password.

39. The method according to claim 1, further comprising a step of limiting the telephone call when the telephone call does not pass fraud control based on personal information of the caller.

40. The method according to claim 39, wherein the personal information of the caller includes at least a portion of at least one of a driver's license number, a social security number, a mother's maiden name, and a password.

41. The method according to claim 1, further comprising the step of blocking the call when the call does not pass fraud control based on a time of day the call is received.

42. The method according to claim 1, further comprising the step of limiting the call when the call does not pass fraud control based on a time of day the call is received.

43. The method according to claim 1, wherein the caller is connected to at least one service representative.

44. The method according to claim 1, wherein the user is connected to a chatroom environment.

45. The method according to claim 1, wherein the user is connected to a talk line.

46. The method according to claim 1, wherein the user is connected to a pay information service.

47. The method according to claim 1, further comprising a step of providing information to the caller that is related to the caller when the service representative is unavailable before the step of connecting the caller to the service representative.

48. The method according to claim 47, wherein the information that is related to the caller is horoscope information.

49. The method according to claim 1, wherein the service representative is a psychic service representative.

50. The method according to claim 1, further comprising a step of limiting the telephone call when the telephone call does not pass fraud control based on the information associated with the credit account being supplied from the caller incorrectly a predetermined number of times.

51. The method according to claim 1, further comprising a step of blocking the telephone call when the telephone call does not pass fraud control based on the information associated with the credit account being supplied from the caller incorrectly a predetermined number of times.

52. A method for controlling telephone call access to a value-added service, the method comprising steps of:
receiving a request from a caller for a telephone call between the caller and a value-added service;
receiving information associated with the caller;
accessing a database;
comparing the received information associated with the caller with information stored in the database;
requesting credit account information associated with the caller when the received information associated with the caller passes the comparison with the information stored in the database; and
connecting the caller to the value-added service when the requested credit account information associated with the caller is received.

53. The method according to claim 52, wherein the step of comparing the received information associated with the caller with information stored in the database verifies an identity of the caller.

54. The method according to claim 52, further comprising a step of limiting the telephone call based on a frequency of telephone calls from the caller during a predetermined period of time before connecting the caller to the value-added service.

55. The method according to claim 52, further comprising a step of limiting the telephone call based an amount of money spent by the caller during a predetermined period of time before connecting the caller to the value-added service.

56. The method according to claim 52, further comprising a step of limiting the telephone call based on a length of telephone call during a predetermined period of time before connecting the caller to the value-added service.

57. The method according to claim 52, further comprising a step of blocking the telephone call based on an amount of money spent by the caller during a predetermined period of time.

58. The method according to claim 52, wherein the received information associated with the caller includes call origination information for the telephone call,
the method further comprising a step of blocking the telephone call based on a comparison of the call origination information with information stored in the database.

59. The method according to claim 52, wherein the received information associated with the caller includes call origination information for the telephone call,
the method further comprising a step of limiting the telephone call based on a comparison of the call origination information with information stored in the database.

60. The method according to claim 52, wherein the received information associated with the caller includes an identification of the caller,
the method further comprising the step of blocking the telephone call based on a comparison of the identification of the caller with information stored in the database.

61. The method according to claim 52, wherein the received information associated with the caller includes an identification of the caller,
the method further comprising a step of limiting the telephone call based on a comparison of the identification of the caller with information stored in the database.

62. The method according to claim 52,
further comprising a step of blocking the caller based on a comparison of the credit account information associated with the caller with information stored in the database.

63. The method according to claim 62, wherein the credit account information includes credit card information.

64. The method according to claim 62, wherein the credit account information includes debit card information.

65. The method according to claim 62, wherein the credit account information includes checking account information.

66. The method according to claim 62, wherein the credit account information includes electronic funds transfer information.

67. The method according to claim 62, wherein the credit account information includes a telephone number.

68. The method according to claim 62, wherein the credit account information relates to a cable television account.

69. The method according to claim 62, wherein the credit account information relates to a utility service account.

70. The method according to claim 52, further comprising the step of limiting the telephone call based on a comparison of the credit account information associated with the caller with information stored in the database.

71. The method according to claim 70, wherein the credit account information includes credit card information.

72. The method according to claim 70, wherein the credit account information includes debit card information.

73. The method according to claim 70, wherein the credit account information includes checking account information.

74. The method according to claim 70, wherein the credit account information includes electronic funds transfer information.

75. The method according to claim 70, wherein the credit account information includes a telephone number.

76. The method according to claim 70, wherein the credit account information relates to a cable television account.

77. The method according to claim 70, wherein the credit account information relates to a utility service account.

78. The method according to claim 52, further comprising a step of blocking the telephone call when the telephone call does not pass fraud control based on a caller billing address.

79. The method according to claim 52, further comprising a step of limiting the telephone call when the telephone call does not pass fraud control based on a caller billing address.

80. The method according to claim 52, further comprising a step of blocking the telephone call when the telephone call does not pass fraud control based on personal information of the caller.

81. The method according to claim 80, wherein the personal information of the caller includes at least a portion of at least one of a driver's license number, a social security number, a mother's maiden name, and a password.

82. The method according to claim 52, further comprising a step of limiting the telephone call when the telephone call does not pass fraud control based on personal information of the caller.

83. The method according to claim 82, wherein the personal information of the caller includes at least a portion of at least one of a driver's license number, a social security number, a mother's maiden name, and a password.

84. The method according to claim 52, further comprising the step of blocking the call when the call does not pass fraud control based on a time of day the call is received.

85. The method according to claim 52, further comprising the step of limiting the call when the call does not pass fraud control based on a time of day the call is received.

86. The method according to claim 52, wherein the caller is connected to at least one service representative.

87. The method according to claim 52, wherein the user is connected to a chatroom environment.

88. The method according to claim,52, wherein the user is connected to a talk line.

89. The method according to claim 52, wherein the user is connected to a pay information service.

90. The method according to claim 52, wherein the database is a shared database.

91. The method according to claim 52, wherein the database is located locally.

92. The method according to claim 52, wherein the database is located at a remote site.

93. The method according to claim 52, further comprising a step of limiting the telephone call when the telephone call does not pass fraud control based on the information associated with the caller being supplied from the caller incorrectly a predetermined number of times.

94. The method according to claim 52, further comprising a step of blocking the telephone call when the telephone call does not pass fraud control based on the information associated with the caller being supplied from the caller incorrectly a predetermined number of times.

95. A method for initiating fraud control features used in billing a telephone call between a caller and a value-added service, the method comprising steps of:
establishing call limit criteria for a telephone call;
determining an identity of a caller;
retrieving telephone call history information from memory for the identified caller;
comparing the telephone call history information with the call limit criteria;

limiting at least one of a duration of a telephone call, a number of telephone calls of the identified caller and an amount of money that can be spent by the caller;

receiving telephone call origination information;

requesting telephone call origination information from the caller;

receiving the requested telephone call origination information from the caller;

comparing the requested telephone call origination information with the received telephone call origination information; and blocking a telephone call when the requested telephone call origination information does not match the received telephone call origination information.

96. The method according to claim 95, further comprising a step of obtaining address information from storage for a caller.

97. The method according to claim 96, further comprising steps of:

comparing a postal code of the caller obtained during the identity determination step with a postal code address obtained from storage for the caller; and denying service when the postal codes do not match.

98. The method according to claim 96, further comprising a step of:

comparing a predetermined number of digits of an address of the caller obtained during the identity determination steps with address information obtained from storage for the caller; and denying service when the predetermined number of digits do not match the address information obtained from storage.

99. The method according to claim 96, wherein the step of determining the identity of a caller includes the step of verifying the address information from a credit card agency.

100. The method according to claim 96, wherein the step of determining the identity of a caller includes the step of verifying the address information from a banking institution.

101. The method according to claim 95, wherein the value-added service is a connection to a service representative, and wherein when the call is not blocked, the method further comprising steps of:
determining whether a service representative is available for a telephone call; and
offering an alternative service to the caller when a service representative is not available for a telephone call.

102. The method according to claim 95, wherein the value-added service is a connection to a service representative, and wherein when the call is not blocked, the method further comprising steps of:
determining whether a service representative is available for a telephone call; and
automatically switching the caller to another service representative when a service representative is not available for a telephone call.

103. The method according to claim 95, wherein when the call is not blocked, the method further comprising steps of:
collecting a form of payment information;
communicating the form of payment information to a remote site; and receiving payment authorization from the remote site before the caller is connected to the value-added service.

104. The method according to claim 95, further comprising a step of sending telephone call information to a remote site when the telephone call is completed.

105. The method according to claim 95, wherein the step of receiving telephone call origination information is performed by automatically receiving call origination information when the telephone call is requested.

106. The method according to claim 95, further comprising steps of:

comparing the received telephone call origination information against a stored list of call origination information for which telephone calls should be blocked; and blocking a telephone call when the received telephone call origination information is included in the stored list of call origination information for which telephone calls should be blocked.

107. The method according to claim 95, wherein the step of determining the identity of a caller includes the step of comparing a voiceprint of the caller against a voiceprint database.

108. The method according to claim 95, further comprising steps of:

collecting a form of payment information;
communicating the form of payment information to a payment authorization database; and
receiving payment authorization from the payment authorization before the caller is connected to a service representative.

109. The method according to claim 108, further comprising the step of transmitting telephone call charge information associated with the telephone call to the payment authorization database when the telephone call is terminated, the telephone call charge information including information for charging a credit account an amount representing a charge for the telephone call.

110. The method according to claim 109, wherein the form of payment is a credit card.

111. The method according to claim 109, wherein the form of payment is a debit card.

112. The method according to claim 109, wherein the form of payment is a checking account.

113. The method according to claim 109, wherein the form of payment is an electronic funds transfer.

114. The method according to claim 109, wherein the form of payment is a telephone account.

115. The method according to claim 109, wherein the form of payment is a cable television account.

116. The method according to claim 109, wherein the form of payment is a utility service account.

117. The method according to claim 95, wherein the step of blocking the telephone call when the requested telephone call origination information does not match the received telephone call origination information includes a step of allowing the caller to enter the requested call origination information a predetermined number of times before the call is blocked.

118. The method according to claim 95, wherein the step of receiving telephone call origination information is performed by automatically receiving call origination information when the telephone call is requested.

* * * * *